United States Patent
Vranjes et al.

(10) Patent No.: US 11,836,327 B2
(45) Date of Patent: Dec. 5, 2023

(54) APPLICATION WINDOW DIVIDER CONTROL FOR WINDOW LAYOUT MANAGEMENT

(71) Applicant: Microsoft Technology Licensing, LLC, Redmond, WA (US)

(72) Inventors: Miron Vranjes, Seattle, WA (US); Jesse Clay Satterfield, Redmond, WA (US); Matthew Isaac Worley, Bellevue, WA (US); Chaitanya Sareen, Seattle, WA (US); Nils Anders Sundelin, Bothell, WA (US); Abhishek Malani, Redmond, WA (US); Alice Steinglass, Bellevue, WA (US); Robert James Jarrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/705,086

(22) Filed: Mar. 25, 2022

(65) Prior Publication Data

US 2022/0214776 A1 Jul. 7, 2022

Related U.S. Application Data

(63) Continuation of application No. 13/863,369, filed on Apr. 15, 2013, now Pat. No. 11,294,529.

(51) Int. Cl.
*G06F 3/0481* (2022.01)
*G06F 9/451* (2018.01)
*G06F 3/048* (2013.01)

(52) U.S. Cl.
CPC .......... *G06F 3/0481* (2013.01); *G06F 3/048* (2013.01); *G06F 9/451* (2018.02)

(58) Field of Classification Search
CPC ............................. G06F 2203/04803
See application file for complete search history.

(56) References Cited

U.S. PATENT DOCUMENTS

| | | | | |
|---|---|---|---|---|
| 5,487,143 A | * | 1/1996 | Southgate | G06F 3/0485 715/792 |
| 5,712,995 A | * | 1/1998 | Cohn | G06F 3/0481 715/792 |
| 5,771,042 A | * | 6/1998 | Santos-Gomez | G06F 3/0481 715/792 |
| 5,880,725 A | * | 3/1999 | Southgate | G06F 3/0481 715/803 |
| 5,920,315 A | * | 7/1999 | Santos-Gomez | G06F 3/0481 715/792 |

(Continued)

*Primary Examiner* — Justin S Lee
(74) *Attorney, Agent, or Firm* — Barta, Jones & Foley, PLLC

(57) ABSTRACT

An application window divider control is shared by a first application window and a second application window in a user interface. Based on a received directional instruction that moves the application window divider control along an axis of the user interface, placement of the first application window and the second application window may be positioned across a range of consistently spaced points along an axis of the user interface. Placement adjustment can also impact other application windows in the user interface. The application window divider control may also snap to provide "magnetic" points along the axis when certain conditions are satisfied.

17 Claims, 8 Drawing Sheets

(56) References Cited

U.S. PATENT DOCUMENTS

| | | | | |
|---|---|---|---|---|
| 6,008,809 | A * | 12/1999 | Brooks | G06F 3/0481 715/792 |
| 6,166,736 | A * | 12/2000 | Hugh | G06F 3/0481 715/777 |
| 6,195,094 | B1 * | 2/2001 | Celebiler | G06F 3/0481 715/764 |
| 6,661,436 | B2 * | 12/2003 | Barksdale | G06F 3/0481 715/788 |
| 7,155,682 | B2 * | 12/2006 | Rodden | G09G 5/14 715/788 |
| 7,549,127 | B2 * | 6/2009 | Chasen | G06F 9/451 715/788 |
| 7,890,882 | B1 * | 2/2011 | Nelson | G06F 9/451 715/788 |
| 8,276,095 | B2 * | 9/2012 | Cutler | G06F 3/0481 715/782 |
| 2002/0191028 | A1 * | 12/2002 | Senechalle | G06F 3/0481 715/800 |
| 2005/0188329 | A1 * | 8/2005 | Cutler | G06F 3/0481 715/788 |
| 2006/0020903 | A1 * | 1/2006 | Wang | G06F 3/0481 715/792 |
| 2006/0053384 | A1 * | 3/2006 | La Fetra, Jr. | G06F 9/445 715/765 |
| 2008/0126989 | A1 * | 5/2008 | Flores | H04N 21/4143 715/833 |
| 2008/0163104 | A1 * | 7/2008 | Haug | G06F 3/0481 715/788 |
| 2009/0265662 | A1 * | 10/2009 | Bamford | G06F 3/04886 345/173 |
| 2010/0088634 | A1 * | 4/2010 | Tsuruta | G06F 3/0481 715/788 |
| 2011/0119597 | A1 * | 5/2011 | Yellamraju | H04L 65/4038 715/753 |
| 2012/0054674 | A1 * | 3/2012 | Beykpour | G06F 3/0481 715/788 |
| 2012/0166980 | A1 * | 6/2012 | Yosef | G06F 9/451 715/762 |
| 2012/0299968 | A1 * | 11/2012 | Wong | G06F 3/0481 345/660 |
| 2012/0304092 | A1 * | 11/2012 | Jarrett | G06F 3/04883 715/764 |
| 2013/0024805 | A1 * | 1/2013 | In | G11B 27/34 715/846 |
| 2013/0120295 | A1 * | 5/2013 | Kim | G06F 3/0486 345/173 |
| 2013/0254708 | A1 * | 9/2013 | Dorcey | G06F 3/04886 715/788 |
| 2014/0089831 | A1 * | 3/2014 | Kim | G06F 3/04883 715/769 |
| 2014/0237421 | A1 * | 8/2014 | Kuhne | G06F 40/103 715/800 |
| 2014/0325430 | A1 * | 10/2014 | Vranjes | G06F 9/445 715/788 |

* cited by examiner

US 11,836,327 B2

APPLICATION WINDOW DIVIDER CONTROL FOR WINDOW LAYOUT MANAGEMENT

CROSS-REFERENCE TO RELATED APPLICATION

This application is a continuation application of and claims priority to U.S. patent application Ser. No. 13/863,369, entitled "Application Window Divider Control for Window Layout Management," filed on Apr. 15, 2013, the disclosure of which is incorporated herein by reference in its entirety.

BACKGROUND

A computer operating system, including its corresponding user interface, allows a user to adjust an application window for presentation to the user through the user interface. However, such user-directed adjustments come with inconvenient limitations, particularly as user interfaces become more modern and flexible.

SUMMARY

Implementations described and claimed herein address the foregoing problems by providing an application window divider control that is shared by a first application window and a second application window in a user interface. Based on a received directional instruction that moves the application window divider control along an axis of the user interface, placement of the first application window and the second application window may be positioned across a range of consistently spaced points along an axis of the user interface. Placement adjustment can also impact other application windows in the user interface. The application window divider control may also snap to provide "magnetic" points along the axis when certain conditions are satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Launching an application window includes without limitation initially executing the application and switching to a new or hidden application window of an already executing application. In addition, an application window may include without limitation a window of the operating system components, an operating system utility, and a special purpose application program (e.g., a Web browser program, a word processing program, a spreadsheet program).

Figure 1:
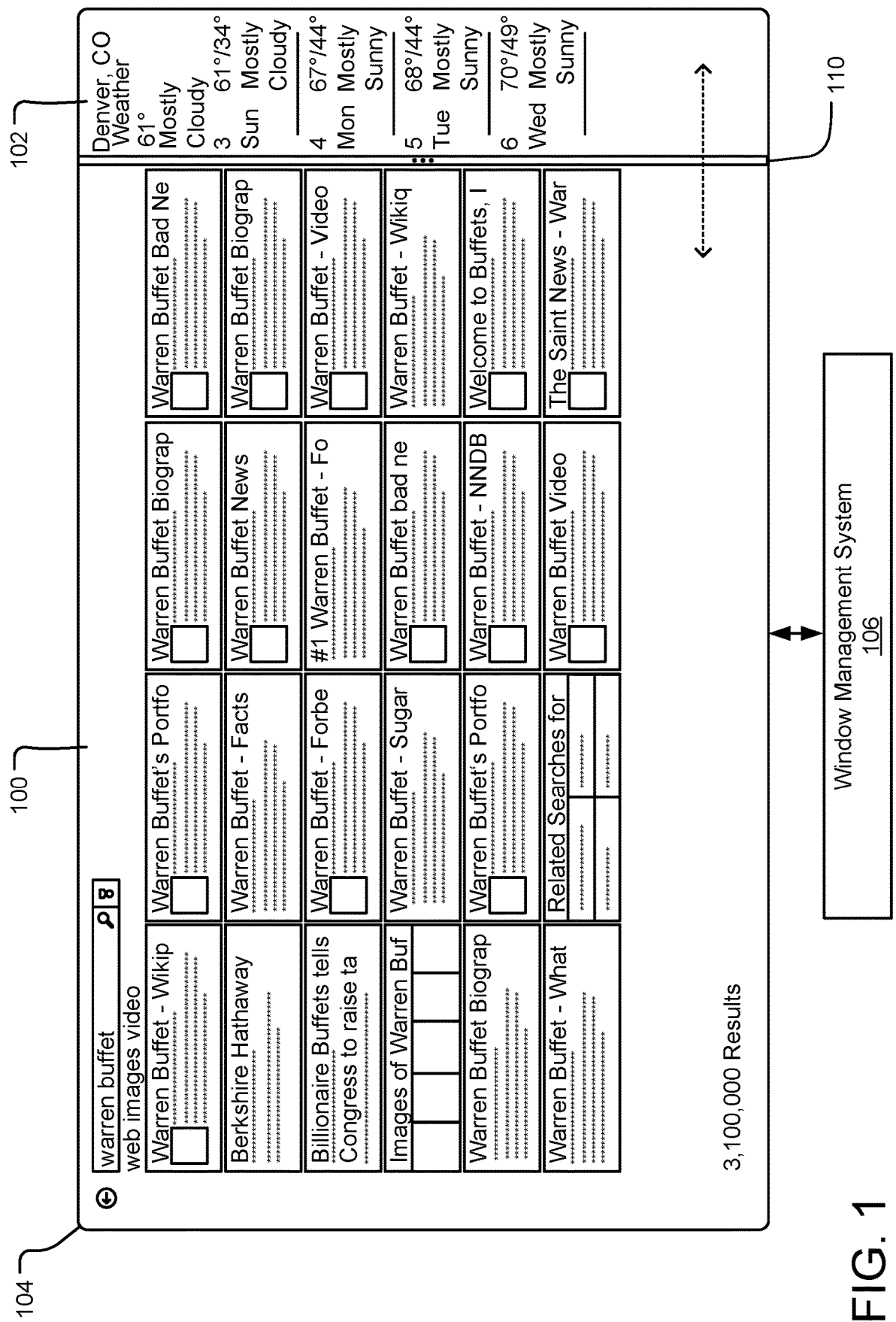
FIG. 1 illustrates two application windows sharing an application window divider control in an example user interface screen.

FIG. 1 illustrates two application windows 100 and 102 sharing an application window divider control 110 in an example user interface screen 104. A window management system 106 is typically a component of an operating system or user interface environment but could also be an independent application. The window management system 106 manages the display, placement, layout, appearance, and other aspects of the application windows 100 and 102, as well as other windows and user interface characteristics and operations.

The application window 100 presents a search result window displaying search results from a Web search engine. The individual search results (such as a search result 108) includes representative text and/or one or more images along with a browser navigable link, which can be selected by the user for navigation to a Web site identified by the browser navigable link. The application window 102 presents results from a weather application or Web site, including a 4-day forecast of weather in Denver, CO A window boundary control 110 divides the displayed area of the application window 100 and displayed area of the application window 102, in the illustrated case, separating the application windows. In some implementations, the window boundary control 110 may be manipulated by the user to change the size and/or location of one or both windows.

The application windows 100 and 102 are shown in FIG. 1 as being non-overlapping windows. However, the described technology is not limited to non-overlapping windowing environments. For example, in such environments, each application window in an overlapping windowing environment may be bounded by a window boundary control, which can be manipulated by the user to change the location, size, and front-to-back ordering (collectively, "placement") of the potentially overlapping windows (e.g., the z-ordering of the windows). The window management system 106 receives input through the application windows 100 and 102 and through other user interface components (e.g., the keyboard interface, a touch screen interface, a voice interface, and pointing device) and displays the applications windows 100 and 102, the window boundary control 110, and other application windows and controls through the user interface.

The window boundary control 110 represents a divider between the two distinct application windows 100 and 102 or between an application window and an empty space in the user interface, and therefore may also be referred to as an "application window divider control." The application window divider control may be manipulated through the user interface to communicate changes in the size of an application window (with respect to an empty space) or in the relative sizes of the application windows 100 and 102 to the window management system 106. Accordingly, functionality of the application window divider control represents a window management system control that, rather than being a component of one application window or another, provides an external boundary of one or more application windows and, in some configuration, may be shared by the two or more application windows as part of the user interface and window management system 106.

In one implementation, two or more application window divider controls may merge together to form a single application window divider control. For example, two application windows may be presented along a horizontal axis of a user interface, separated by an empty space. In this scenario, each application is displayed with an application window divider control between the application window and the empty space. If one of the application window divider controls is dragged to the other application window divider control, the empty space is filled with the expanded application window and the two application window divider controls merge into a single application window divider control within the user interface. In addition, the two application window divider controls can "snap" into a single application window divider control when the empty space between then narrows to a minimum empty space width.

Although FIG. 1 illustrates a non-overlapping windowing environment, overlapping windowing environments may also employ an application window divider, whether as a window management system control dividing one application window from another or dividing/bounding an application window relative to an empty space in the user interface or another application window partially occluded by the application window.

A user can select the application window divider control (e.g., via a touch screen, a pointing device, keyboard input) and drag it right and left along a wide range of relatively continuous locations along the horizontal extent of the user interface. For example, a user can give the application window divider control focus (e.g., by selecting it), and then the user can move the application window divider control by depressing or otherwise activating a keyboard input (e.g., an arrow key) until the application window divider control is at a desired location along the axis. In one implementation, the relatively continuous locations comprise tightly and consistently spaced points along the horizontal axis (e.g., each point separated from an adjacent point by a small number of pixels or some other visually continuous spacing). It should be understood that alternative implementations may provide relatively continuous window divider control along the vertical extent of the user interface or along some other axis. A user interface may also include multiple application window divider controls, some of which may intersect on different axes.

In one implementation, responsive to the user-induced movement of the application window divider control in a horizontal direction, the user interface provides a visual cue suggesting the continuous relative sizing of the application windows 100 and 102. For example, the application window divider control itself moves, at least one of the application windows appears to resize dynamically, or some other user-friendly suggestion of resizing is animated in the user interface. In one implementation, the application windows may be represented during resizing as snapshots of each window captured at or near the initiation of the directional instruction. In another implementation, the application windows may be represented during resizing as live application windows or other window placeholder representations.

When the user commits to the resizing (e.g., removes his or her touch, deselects the pointing device button, etc.), then both application windows snap into place at the relative sizes designated by the last location of the application window divider control. In another implementation, responsive to the user-induced movement of the application window divider control in a horizontal direction, the adjacent sides of the application windows 100 and 102 move in visual conformity with the application window divider control. For example, the application window divider moves continuous and both application windows 100 and 102 resize dynamically. When the user commits to the resizing (e.g., removes his or her touch, deselects the pointing device button, etc.), then both application windows remain at the relative sizes designated by the last location of the application window divider control.

Figure 2:
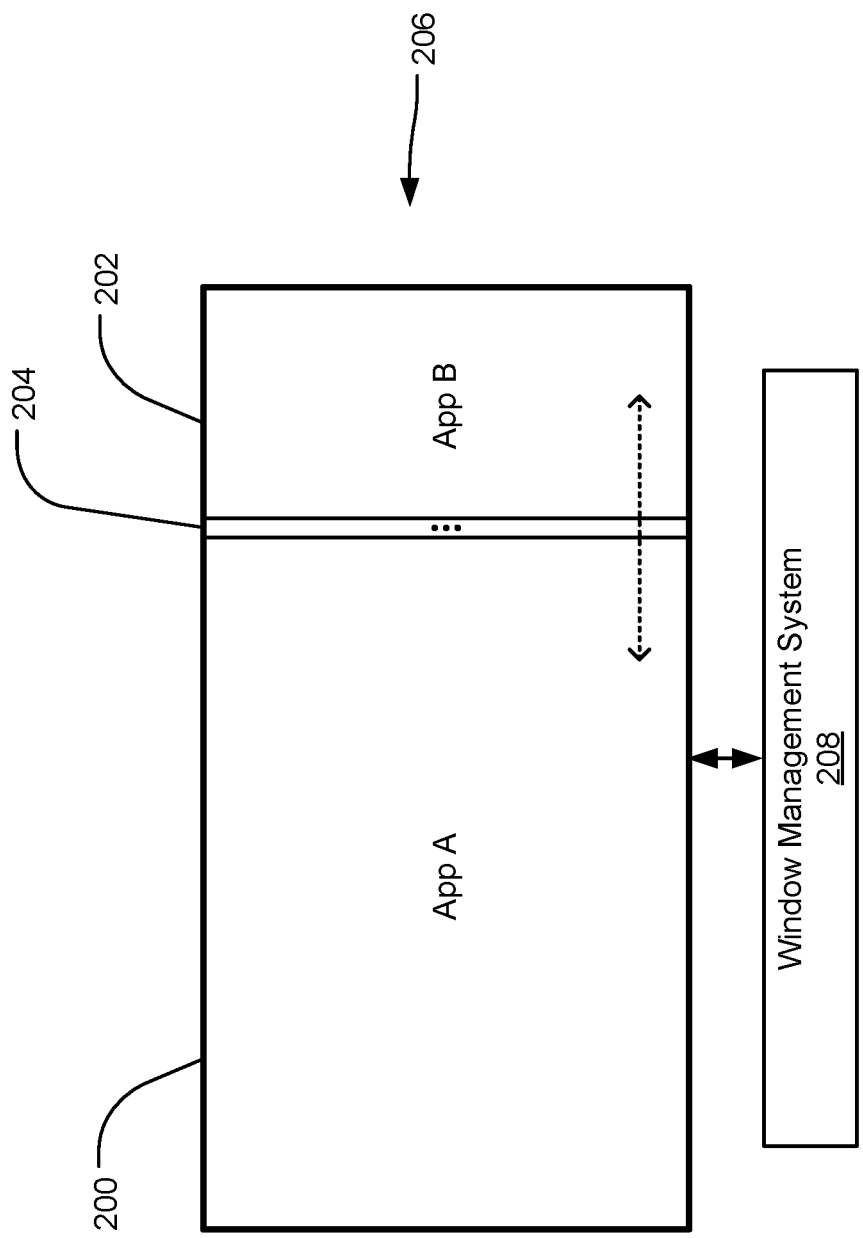
FIG. 2 illustrates a schematic of two application windows sharing an application window divider control in an example user interface.

FIG. 2 illustrates a schematic of two application windows (e.g., application window 200 for App A and application window 202 for App B) sharing an application window divider control 204 in an example user interface 206. The application window divider control 204 is shared by the application windows 200 and 202 but is not a component of either application window. The application window divider control 204 is a control of a window management system 208, which manages the display, placement, layout, appearance, and other aspects of the application windows 200 and 202, as well as other windows and user interface characteristics and operations. The window management system 208 manages the user manipulation of the application window divider control 204, including the receipt of user input (e.g., a directional instruction, such as a drag), the mutual resizing of the application windows 200 and 202, and the presentation of the application windows 200 and 202 within the user interface 206.

As shown in FIG. 2, the application window divider control 204 can be moved along the horizontal axis of the user interface 206 in response to a user-provided directional instruction. Upon completion of the directional instruction (e.g., the user commits to the dragging of the application window divider control by lifting a finger from the touch screen), the application windows 200 and 202 adjust their placement in according to the end point of the direction instruction (e.g., the location of the application window divider control 204 along the axis when the directional instruction is completed). In FIG. 2, this placement adjustment would result in the complimentary resizing of the application windows 200 and 202 based on the final location of the application window divider control 204.

Figure 3:
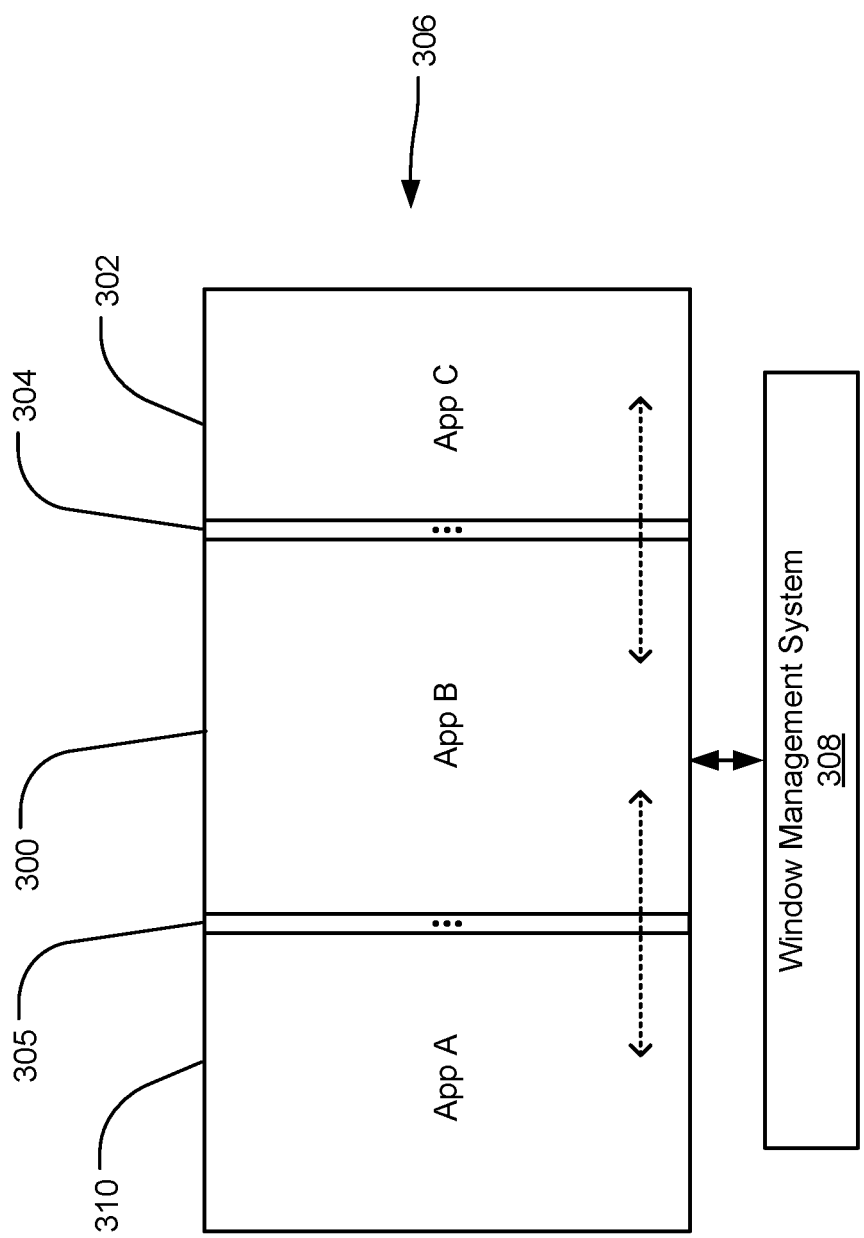
FIG. 3 illustrates a schematic of two application windows sharing an application window divider control and a third application window in an example user interface.

FIG. 3 illustrates a schematic of two application windows (e.g., application window 300 for App B and application window 302 for App C) sharing an application window divider control 304 and a third application window (e.g., application window 310 for App A) in an example user interface 306. The application window divider control 304 is shared by the application windows 300 and 302 but is not a component of either application window. Another application window divider control 305 is also presented in the user interface 306 and is shared by the application windows 310 and 300. The application window divider controls 304 and 305 are controls of a window management system 308, which manages the display, placement, layout, appearance, and other aspects of the application windows 300, 302, and 310, as well as other windows and user interface characteristics and operations. The window management system 308 manages the user manipulation of the application window divider controls 304 and 305, including the receipt of user input (e.g., a directional instruction, such as a drag), the mutual resizing of the application windows 300 and 302 based on the application window divider control 304, the mutual resizing of the application windows 300 and 310 based on the application window divider control 305, and the presentation of the application windows 300, 302, and 310 within the user interface 306.

As shown in FIG. 3, the application window divider controls 304 and 305 can be moved along the horizontal axis of the user interface 306 in response to a user-provided directional instruction. Upon completion of the directional instruction (e.g., the user commits to the dragging of the application window divider control by lifting a finger from the touch screen) relating to the application window divider control 304, the window management system 308 adjusts the placements of the application windows 300 and 302 in accordance with the end point of the direction instruction (e.g., the location of the application window divider control 304 along the axis when the directional instruction is completed). In FIG. 3, this placement adjustment would result in the complimentary resizing of the application windows 300 and 302 based on the final location of the application window divider control 304. A similar behavior for application windows 300 and 310 would occur responsive to a directional instruction provided to the application window divider control 305. In addition, each application window divider control 304 and 305 may also impact placement of application windows that it does not share (e.g., divide). For example, in some circumstances, a directional instruction to the application window divider control 304 can cause a placement adjustment to the application window 310, as described below.

Figure 4:
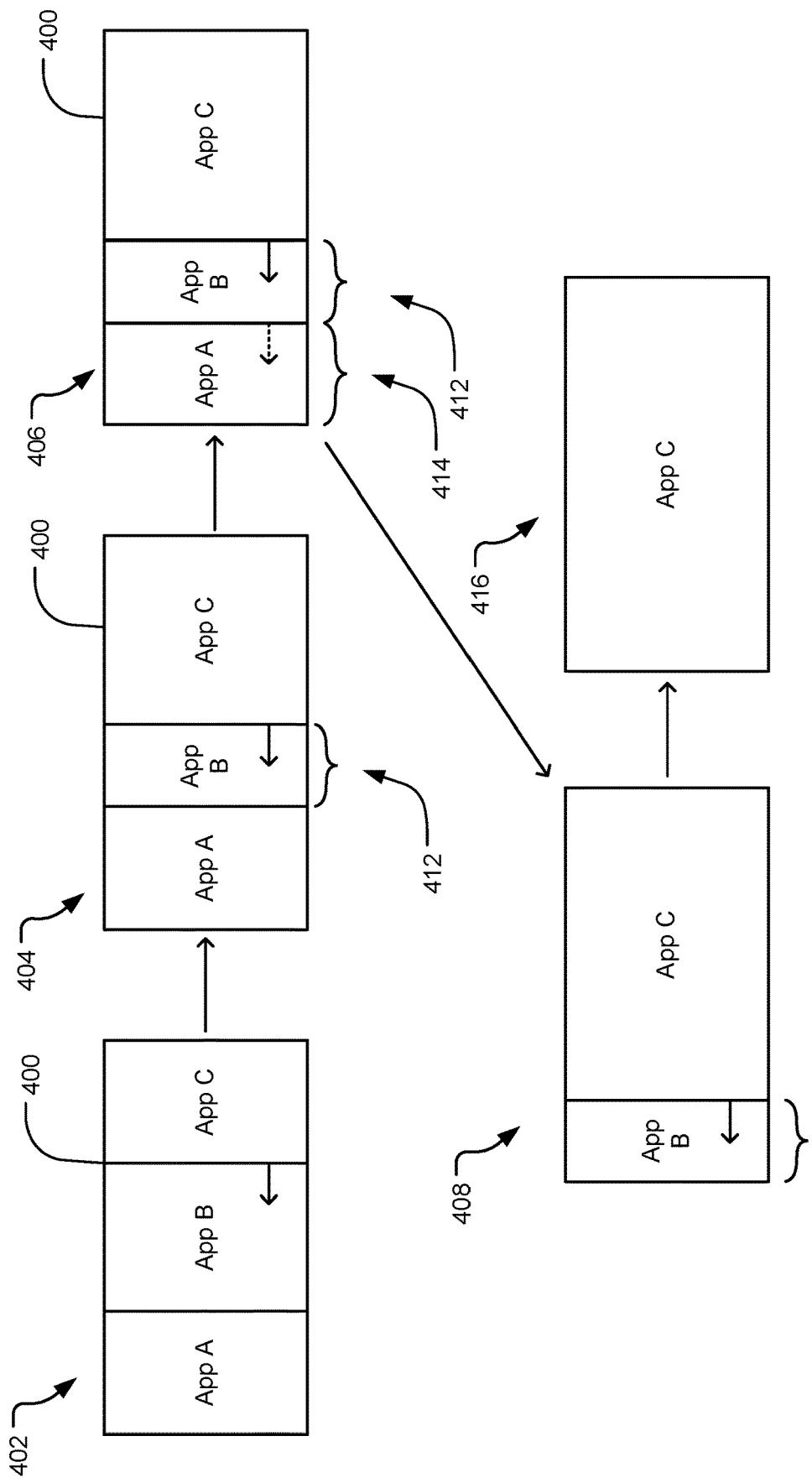
FIG. 4 illustrates an example sequence of user interface operations implementing an application window divider control.

FIG. 4 illustrates an example sequence of user interface operations implementing an application window divider control 400. At 402, a user interface presents application windows for App A, App B, and App C. A directional instruction is provided to the application window divider control 400, moving it in the left direction toward App B and App A and adjusting the placement (e.g., the sizing) of the application window for App B (e.g., decreasing its width) and adjusting the placement (e.g., the sizing) of the application window for App C (e.g., increasing its width). At 404, the placement of the application window for App B has satisfied a minimum size condition 412—once the width of the application window for App B decreases to a given width threshold, which may be statically or dynamically determined, the width of the application window for App B does not continue to decrease.

Instead, as shown at 406, the continuing directional instruction causes the application window for App A to adjust its placement (e.g., decreasing its width), while the width of the application window for App B remains at its minimum size condition 412. When the placement of the application window for App A has satisfied its minimum size condition 414, the width of the application window for App A also stops decreasing.

Accordingly, the continuation of the directional instruction has decreased the widths of the applications windows for App A and App B to their minimum size conditions 414 and 412 respectively. Therefore, at 408, the continuation of the directional instruction causes the application window for App A to be removed from the user interface. In one implementation, the application window for App A is animated to appear to be pushed out of the left edge of the user interface (e.g., in the direction of the directional instruction).

At 416, the directional instruction continues to cause the application window for App B to be removed from the user interface. In one implementation, the application window for App B is animated to appear to be pushed out of the left edge of the user interface (e.g., in the direction of the directional instruction).

At each stage in the operational flow in FIG. 4, the directional instruction can be completed (e.g., by the user lifting a finger off of the touch screen, by the user removing a finger from the depressed button of a pointing device, by the user providing an appropriate keyboard input to complete the directional instruction). At any point along the axis in the user interface that an application window divider control is located when the directional instruction is completed, the window management system presents the placement of the application windows in accordance with the placement of the corresponding application window divider controls.

In one implementation, the window management system records previous window sizes and placements to allow a user to undo one or more resizing operations.

Figure 5:
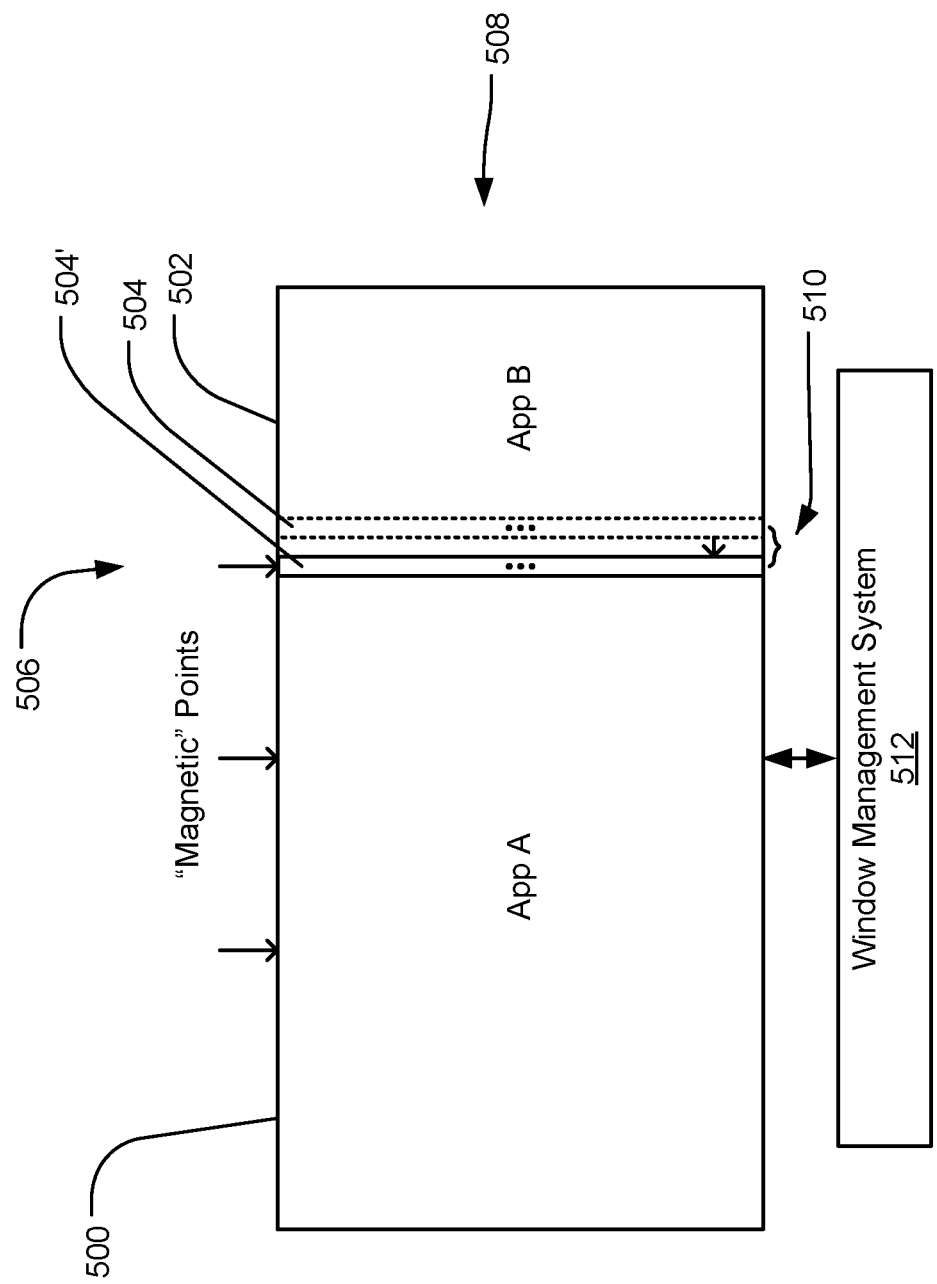
FIG. 5 illustrates a schematic of two application windows sharing an application window divider control at a magnetic point in an example user interface.

FIG. 5 illustrates a schematic of two application windows 500 and 502 sharing an application window divider control 504 at a magnetic point 506 in an example user interface 508. The application window divider control 504 is shared by the application windows 500 and 502 but is not a component of either application window. The application window divider control 504 is a control of a window management system 512, which manages the display, placement, layout, appearance, and other aspects of the application windows 500 and 502, as well as other windows and user interface characteristics and operations. The window management system 512 manages the user manipulation of the application window divider control 504, including the receipt of user input (e.g., a directional instruction, such as a drag), the mutual resizing of the application windows 500 and 502, and the presentation of the application windows 500 and 502 within the user interface 508.

As shown in FIG. 5, the application window divider control 504 can be moved along the horizontal axis of the user interface 508 in response to a user-provided directional instruction. Based a completion of the directional instruction (e.g., the user commits to the dragging of the application window divider control by lifting a finger from the touch screen), the application windows 500 and 502 adjust their placement in according to the end point of the direction instruction (e.g., the location of the application window divider control 504 along the axis when the directional instruction is completed). In FIG. 5, this placement adjustment would result in the complimentary resizing of the application windows 500 and 502 based on the final location of the application window divider control 504.

In addition, FIG. 5 shows three "magnetic" points along the horizontal axis of the user interface 508, although any number of magnetic points is contemplated. Each magnetic point represents a position on the horizontal axis of the user interface 508 to which the application window divider control 504 is pulled when, during a directional instruction, the movement of the application window divider control 504 satisfies a speed condition (e.g., movement slows below a speed threshold) and/or a distance condition (e.g., movement brings the application window divider 504 within a given distance threshold 510 from the magnetic point). For example, as the application window divider control 504 is moved from the left to the right across the horizontal axis of the user interface 508, the user can slow the movement near the magnetic point 506, which can cause the application window divider control 504 to snap to its location shown as 504'.

The location of the magnetic points may be determined statically for a set of visible application windows or dynamically during a directional instruction. For example, a statically determined magnetic point may be located at the center of the horizontal axis when two application windows are visible or magnetic points may be placed at thirds along the horizontal axis when three application windows are visible. In contrast, the location of some magnetic points may be determined dynamically during a directional instruction. For example, responsive to initiation of the directional instruction, the window management system can calculate the locations of any magnetic points along the axis, and in some implementations, the locations may be dynamically updated as the directional instruction continues to be executed, subject to application window placement preferences and other constraints. Eventually, when the directional instruction is committed, the application window divider controls will snap to the dynamically calculated locations of the magnetic points.

The term "snap" describes moving the application window divider control 504 to align with the magnetic point 506 along the axis when the application window divider control 504 is not initially aligned with the magnetic point 506 but the movement of the application window divider control 504 satisfies a speed condition and a distance condition relative to the magnetic point 506. Visually, in one implementation, this snapping operation appears as a relatively rapid movement or jump by the application window divider control 504 to align with the magnetic point 506. Although, in alternative implementations, the snapping operation can be presented through the user interface 508 in other ways (e.g., the snapping of window boundaries, the rapid movement of ghost images of application windows, etc.).

It should be understood that various types of magnetic points may be employed. In one example, magnetic points may be positioned to maintain consistent horizontal and/or sizing of application windows (e.g., each of three windows have the same width). In another example, minimum and maximum windows sizes, user-defined size preferences, and system defined window preferences may also be considered in the placement of magnetic points along an axis within the user interface.

In one implementation, one or more application window divider controls may be automatically snapped to appropriate magnetic points via a double-click, a double-tap, or a key combination on or in relation to one of the application window divider controls. Such user input can instruct one or more application window divider controls to move in an appropriate direction to snap to the nearest magnetic point, subject to application window placement preferences and other constraints. In one implementation, repeating the user input on the same application window divider control causes the application window divider controls of the visible application windows within the user interface to move in appropriate directions to snap to the nearest magnetic points, subject to application window placement preferences and other constraints.

Figure 6:
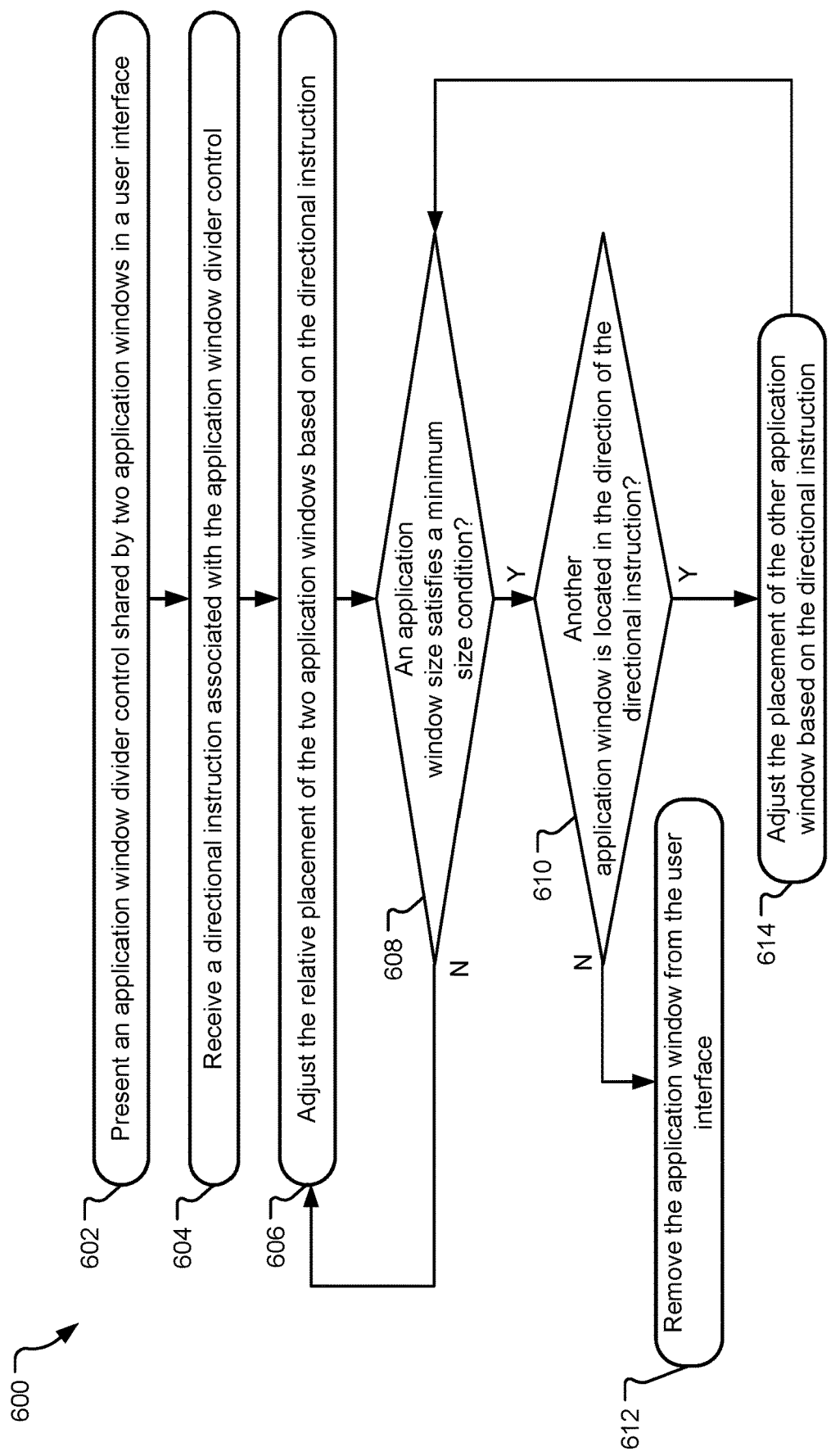
FIG. 6 illustrates example operations for adjusting placement of two application windows using an application window divider control.

FIG. 6 illustrates example operations 600 for adjusting placement of two application windows using an application window divider control. A presenting operation 602 presents an application window divider control shared by two application windows in a user interface. In one implementation, the application window divider control separates or acts as a boundary between the two application windows. An instruction operation 604 receives a directional instruction (e.g., a drag gesture) in association with the application window divider control. An adjusting operation 606 adjusts the relative placement of the two application windows based on the directional instruction applied to the application window divider control. For example, one application window gets narrower and the other application window gets wider within the user interface as the application window divider control moves or after its movement is completed.

A decision operation 608 determines whether one of the application windows has been sized to satisfy a minimum size condition (note: different application windows can have different minimum size conditions). If not, the adjusting operation 606 continues processing the directional instruction. If the decision operation 608 determines whether one of the application windows has satisfied a minimum size condition, that application window stops getting narrower, and another decision operation 610 determines whether another application window is located in the direction of the directional instruction within the user interface. If not, the application window satisfying the minimum size condition is removed from the user interface in a removal operation 612. Otherwise, another adjusting operation 610 adjusts the placement of the other application window based on the directional instruction. In one implementation, the visual effect of the adjusting operation 610 resembles the first minimum window freezing at its minimum width and starting to push the side of the next window so that the next window gets narrower.

It should be understood that the next window may also reach a width that satisfies its minimum width condition. Accordingly, if the directional instruction continues in the same direction, then the next minimum window may be removed from the user interface in a manner similar to that discussed with regard to the removal operation 612. Further, subsequent to removal of the next minimum window and subject to a continued directional instruction in the same direction, the first minimum window may be removed in a manner similar to that discussed with regard to the removal operation 612.

Figure 7:
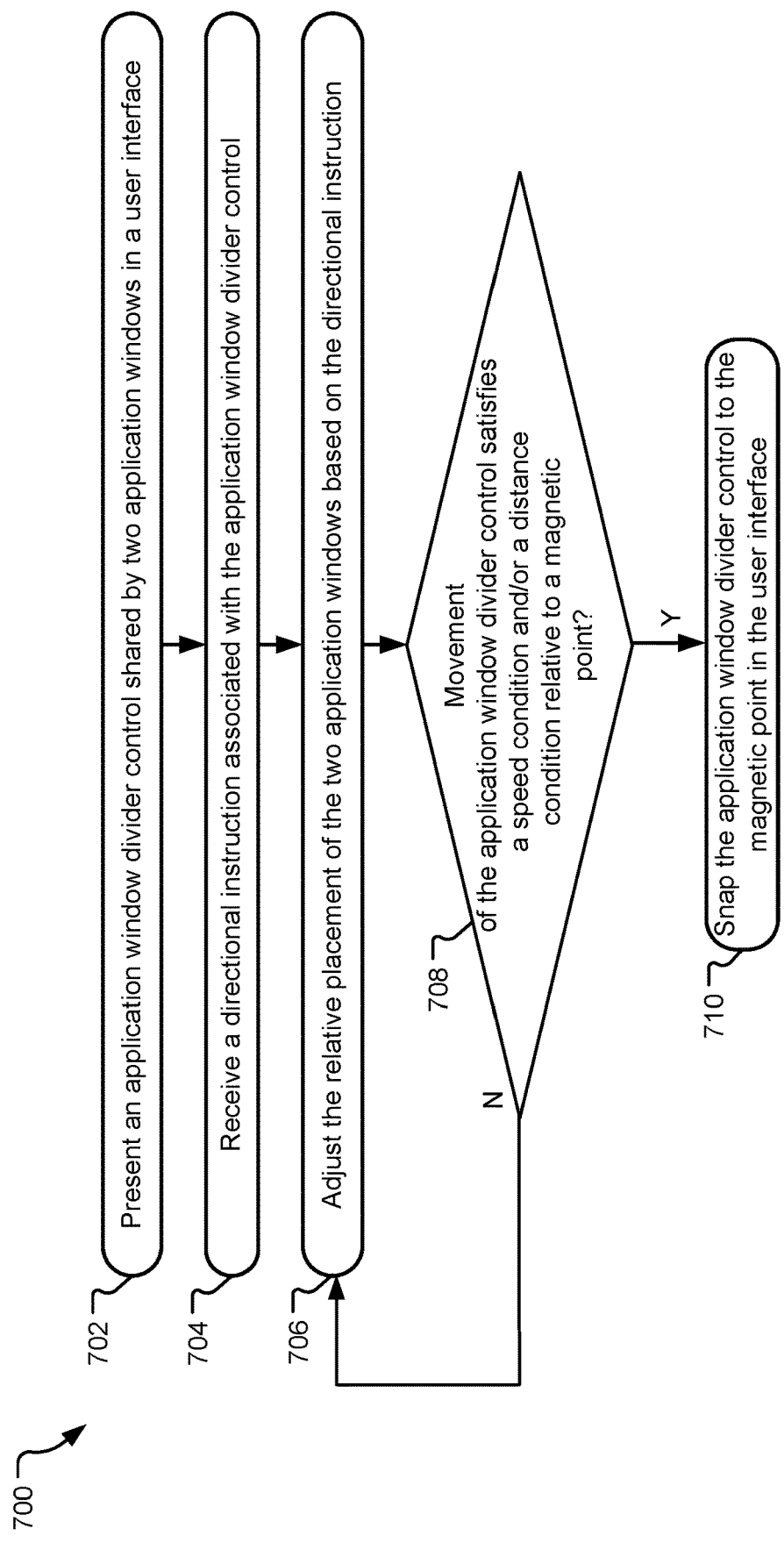
FIG. 7 illustrates example operations for operating an application window divider control relative to a magnetic point in an example user interface.

FIG. 7 illustrates example operations 700 for operating an application window divider control relative to a magnetic point in an example user interface. A presenting operation 702 presents an application window divider control shared by two application windows in a user interface. In one implementation, the application window divider control separates or acts as a boundary between the two application windows. An instruction operation 704 receives a directional instruction (e.g., a drag gesture) in association with the application window divider control. An adjusting operation 706 adjusts the relative placement of the two application windows based on the directional instruction applied to the application window divider control.

A decision operation 708 determines whether movement of the application window divider control satisfies a speed condition and/or a distance condition relative to a magnetic point located along an axis of the user interface. For example, the decision operation 708 may determine that the speed of the application window divider control movement is below a given speed threshold. In another example, the decision operation 708 may determine that the distance between the application window divider control and the magnetic point is below a given distance threshold. In yet another example, the decision operation 708 tests both the speed condition and the distance condition to proceed to a snap operation 710. If the appropriate conditions are not satisfied in the decision operation 708, the adjusting operation 706 continues to adjust the relative placement of the two application windows.

If the appropriate condition or conditions are satisfied in the decision operation 708, the snap operation 710 snaps the application window divider control to the magnetic point in the user interface. In one implementation, the snap operation 710 presents a rapid movement by the application window divider control along the axis from a location that is not aligned with the magnetic point to a location that is aligned with the magnetic point.

It should be understood that such directional instructions, magnetic points, and application window divider controls may be performed, manipulated, or positioned along any axis of the user interface, including without limitation a horizontal axis or a vertical axis.

Figure 8:
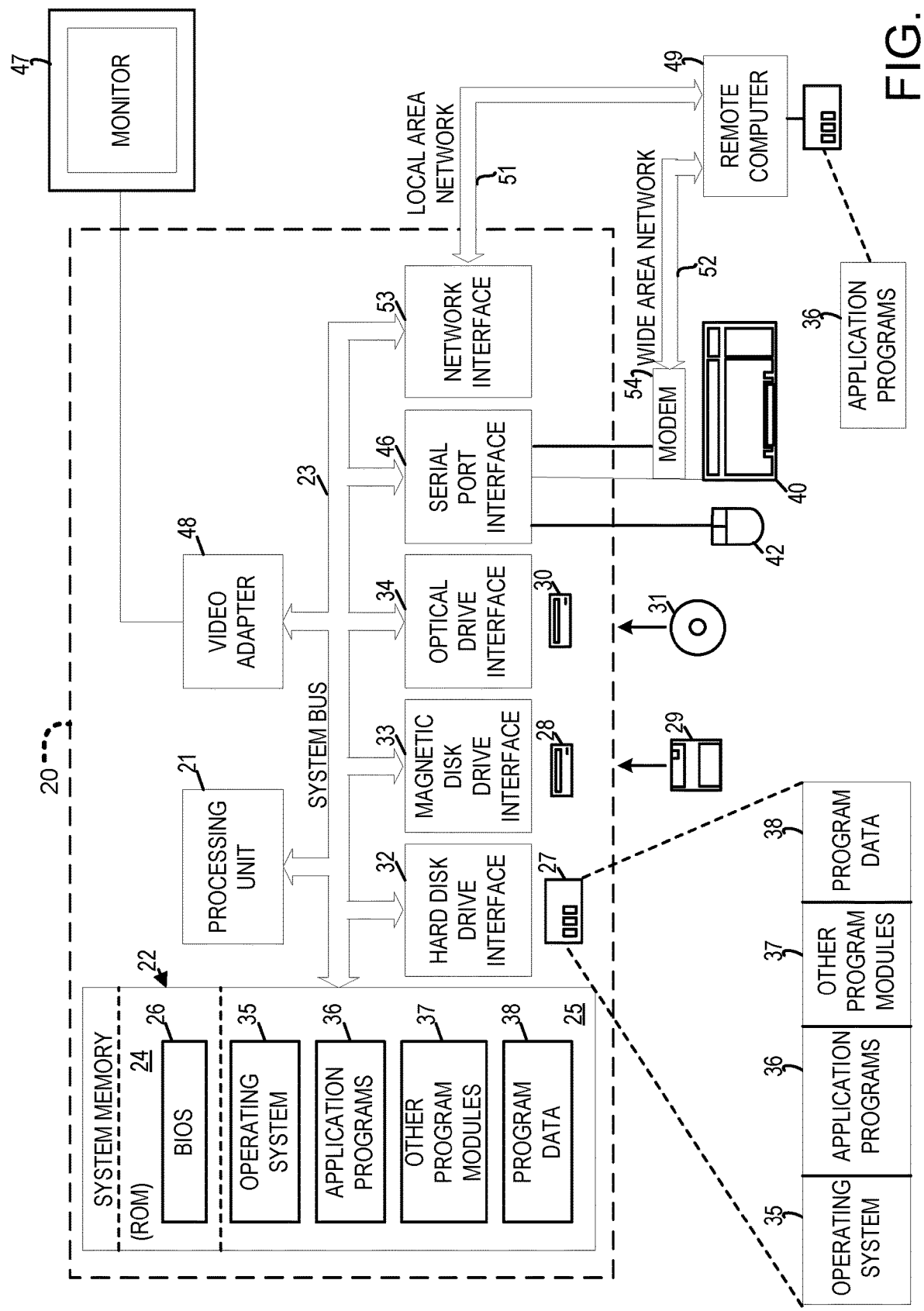
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a window management system, a magnetic point, an application window divider control, and other instructions and data may be stored in memory 22 and/or storage devices 29 or 31 and processed by the processing unit 21. The user interface data, speed thresholds, distance thresholds, and other data may be stored in memory 22 and/or storage devices 29 or 31 as persistent datastores.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
   presenting an application window divider control shared by a first application window and a second application window in a user interface; and
   responsive to a user-induced movement of the application window divider control, providing a visual cue representing relative sizing options of the first application window and the second application window resulting from the user-induced movement prior to receiving a user-commitment of the user-induced movement, the visual cue including snapshots represented near a location of initiation of the user-induced movement, the snapshots providing a representation of each of the first application window and the second application window, each snapshot providing a resizing suggestion for the first application window or the second application window along a horizontal axis or a vertical axis.

2. The method of claim 1 further comprising:
   responsive to the user-induced movement of the application window divider control, moving adjacent sides of the first application window and the second application window in visual conformity with the application window divider control.

3. The method of claim 1 further comprising:
   receiving the user-commitment of the user-induced movement; and
   responsive to receiving the user-commitment, snapping the first application window and the second application window into place at relative sizes designated by a last location of the application window divider control based on the user-induced movement.

4. The method of claim 3 wherein the user-commitment is indicated by at least one of a user removing a touch from the user interface or a user input device, or a user deselecting a point device button.

5. The method of claim 1 further comprising:
   responsive to the user-induced movement, moving adjacent sides of the first application window and the second application window in visual conformity with the application window divider control while removing a third application window from the user interface with an animation that pushes the third application window out of the user interface in a direction of a directional instruction associated with the user-induced movement.

6. The method of claim 1 further comprising:
   responsive to movement of the application window divider control to a point along an axis of the user interface that exceeds a minimum size condition for the first application window, snapping the application window divider control to a next point along the axis to remove the first application window from the user interface and increase a size of the second application window accordingly.

7. The method of claim 6 wherein the snapping of the application window divider control further comprises:
   animating the movement of the first application window to appear to be pushed off an edge of the user interface as the application window divider control snaps to the next point along the axis.

8. One or more hardware computer memories encoding computer-executable instructions for executing on a computer system a computer process, the computer process comprising:
   presenting an application window divider control shared by a first application window and a second application window in a user interface; and
   responsive to a user-induced movement of the application window divider control, providing a visual cue representing relative sizing options of the first application window and the second application window resulting from the user-induced movement prior to receiving a user-commitment of the user-induced movement, the visual cue including snapshots represented at or near a location of an initiation point of the user-induced movement, the snapshots providing a representation of each of the first application window and the second application window, each snapshot providing a resizing suggestion for the first application window or the second application window along a horizontal axis or a vertical axis.

9. The one or more hardware computer memories of claim 8, the computer process further comprising:
   responsive to the user-induced movement of the application window divider control, moving adjacent sides of the first application window and the second application window in visual conformity with the application window divider control.

10. The one or more hardware computer memories of claim 8, the computer process further comprising:
  receiving the user-commitment of the user-induced movement; and
  responsive to receiving the user-commitment, snapping the first application window and the second application window into place at relative sizes designated by a last location of the application window divider control based on the user-induced movement.

11. The one or more hardware computer memories media of claim 10 wherein the user-commitment is indicated by at least one of a user removing a touch from the user interface or a user input device, or a user deselecting a point device button.

12. The one or more hardware computer memories of claim 8 wherein the computer process further comprises:
  responsive to the user-induced movement, moving adjacent sides of the first application window and the second application window in visual conformity with the application window divider control while removing a third application window from the user interface with an animation that pushes the third application window out of the user interface in a direction of a directional instruction associated with the user-induced movement.

13. The one or more hardware computer memories of claim 8 wherein the computer process further comprises:
  responsive to movement of the application window divider control to a point along an axis of the user interface that exceeds a minimum size condition for the first application window, snapping the application window divider control to a next point along the axis to remove the first application window from the user interface and increase a size of the second application window accordingly.

14. The one or more hardware computer memories of claim 13 wherein the snapping of the application window divider control further comprises:
  animating the movement of the first application window to appear to be pushed off an edge of the user interface as the application window divider control snaps to the next point along the axis.

15. A system comprising:
  a computing device presenting a user interface; and
  a window management system, implemented on the computing device, that presents an application window divider control at the user interface, the application window divider control shared by a first application window and a second application window at the user interface, wherein responsive to a user-induced movement of the application window divider control, the window management system provides a visual cue representing relative sizing options of the first application window and the second application window resulting from the user-induced movement prior to receiving a user-commitment of the user-induced movement, the visual cue including snapshots represented at or near a location of an initiation point of the user-induced movement, the snapshots providing a representation of each of the first application window and the second application window, each snapshot providing a resizing suggestion for the first application window or the second application window along a horizontal axis or a vertical axis.

16. The system of claim 15 wherein responsive to the user-induced movement of the application window divider control, the window management system further moves adjacent sides of the first application window and the second application window in visual conformity with the application window divider control.

17. The system of claim 15 wherein the window management system is further configured to, responsive to movement of the application window divider control to a point along an axis of the user interface that exceeds a minimum size condition for the first application window, snap the application window divider control to a next point along the axis to remove the first application window from the user interface and increase a size of the second application window accordingly, wherein the snapping of the application window divider control includes animating movement of the first application window to appear to be pushed off an edge of the user interface as the application window divider control snaps to the next point along the axis.

* * * * *